US012734442B2

(12) United States Patent
Russ et al.

(10) Patent No.: US 12,734,442 B2
(45) Date of Patent: Sep. 15, 2026

(54) ON DEMAND TOGGLE OF AUGMENTED REALITY AND VIRTUAL REALITY EXPERIENCES

(71) Applicant: IGT, Las Vegas, NV (US)

(72) Inventors: Michael Russ, Graz (AT); David Froy, Lakeville-Westmorland (CA); Soheil Latifi, Brampton (CA)

(73) Assignee: IGT, Las Vegas, NV (US)

( * ) Notice: Subject to any disclaimer, the term of this patent is extended or adjusted under 35 U.S.C. 154(b) by 285 days.

(21) Appl. No.: 18/533,223

(22) Filed: Dec. 8, 2023

(65) Prior Publication Data

US 2025/0186884 A1 Jun. 12, 2025

(51) Int. Cl.

*G07F 17/32* (2006.01)
*A63F 13/25* (2014.01)
*A63F 13/525* (2014.01)
*A63F 13/85* (2014.01)

(52) U.S. Cl.

CPC ............ *A63F 13/525* (2014.09); *A63F 13/25* (2014.09); *A63F 13/85* (2014.09); *A63F 2300/8082* (2013.01)

(58) Field of Classification Search

CPC ........ A63F 13/525; A63F 13/25; A63F 13/85; A63F 2300/8082
See application file for complete search history.

(56) References Cited

U.S. PATENT DOCUMENTS 9,111,498 B2 * 8/2015 Border ............... G02B 27/0179
10,019,057 B2 * 7/2018 Osman .................. G06T 19/006
2013/0165205 A1 * 6/2013 Collette .................. A63F 13/52 463/20
2017/0326462 A1 * 11/2017 Lyons ................. G07F 17/3293
2019/0088086 A1 * 3/2019 Rajendran ............. H04W 4/025
2020/0118381 A1 * 4/2020 Nelson ................ G07F 17/3211
2023/0169821 A1 * 6/2023 Russ ................... G07F 17/3227 463/20
2023/0281941 A1 * 9/2023 Dhaliwal ............ G07F 17/3223 345/419
2024/0338993 A1 * 10/2024 Kim ........................ G06F 3/011

OTHER PUBLICATIONS

Miller, C., "Apple 'Reality Pro' headset will toggle between AR/VR, serve as Mac display, 2-hour external battery packs, more," 9to5mac.com, Jan. 23, 2023, <URL: https://9to5mac.com/2023/01/23/apple-reality-pro-headset-features-details/> 5 pages.

* cited by examiner

*Primary Examiner* — Omkar A Deodhar
(74) *Attorney, Agent, or Firm* — Spencer Fane LLP; William M. Kelly

(57) ABSTRACT

A system includes a communication interface, a processing circuit and a memory coupled to the processing circuit. The memory includes machine readable instructions that, when executed by the processing circuit, cause the processing circuit to receive immersion data that corresponds to mixed reality features that are available in a casino environment. The processing circuit is further caused to determine a mixed reality mode based on the immersion data and send, to a customer device and from a mixed reality server, immersion data that corresponds to a selection of virtual reality (VR), and/or augmented reality (AR) features that correspond to the mixed reality mode.

19 Claims, 12 Drawing Sheets

ON DEMAND TOGGLE OF AUGMENTED REALITY AND VIRTUAL REALITY EXPERIENCES

BACKGROUND

Embodiments described herein relate to virtual reality and augmented reality systems and methods.

Gaming devices, such as electronic gaming machines (EGMs) and/or other wagering terminals may be capable of attracting players based on access to wagering opportunities. Such access may provide enjoyment that may be limited to actual outcomes of wagering events. Increasing wagering opportunities and interfaces may provide increased interest in wagering.

BRIEF SUMMARY

Embodiments herein are directed to systems that include a communication interface, a processing circuit, and a memory coupled to the processing circuit. The memory may include machine readable instructions that, when executed by the processing circuit, cause the processing circuit to receive immersion data that corresponds to mixed reality features that are available in a casino environment, determine a mixed reality mode based on the immersion data, and send, to a customer device and from a mixed reality server, immersion data that corresponds to a selection of virtual reality (VR), and/or augmented reality (AR) features that correspond to the mixed reality mode.

Some embodiments are directed to methods that include performing operations according to some embodiments. Operations according to some embodiments include determining, by a mixed reality server, immersion data that corresponds to mixed reality features that are provided in a gaming environment. Operations may include determining, a mixed reality mode that is based on the immersion data and sending, via a communication interface, to a multiple mode wearable headset and from the mixed reality server, immersion data that corresponds to a selection of one of multiple immersion modes.

Operations may include receiving, via the communication interface and into the mixed reality server, physical world location and motion data corresponding to a real world object and the multiple mode wearable headset. Embodiments may further include, in response to the physical world location and motion data, generating VR graphics data that defines a route for a user of the multiple mode wearable headset to avoid a collision with the real world object. Operations may further include, in response to generating the VR graphics data, sending the VR graphics data to the multiple mode wearable headset.

Some embodiments are directed to a system that includes a processing circuit and a memory coupled to the processing circuit. The memory includes machine readable instructions that, when executed by the processing circuit, cause the processing circuit to perform operations recited herein. The processing circuit may cause the processing circuit to receive, via the communication interface and from a mixed reality server, immersion data that corresponds to mixed reality features that are provided to a user in a casino environment. In some embodiments the mixed reality features include a VR mode and an AR mode. A device may be further caused to determine a mixed reality mode that corresponds to the immersion data. Graphical content corresponding to the mixed reality features may be generated. In some embodiments, the graphical content may be displayed on the display. In some embodiments, the graphical content includes VR content and AR content. Some embodiments provide that a gaming session begins with the VR content being displayed on the display and the gaming session transitions to the AR content being displayed on the display. The AR content includes an image of a portion of an electronic gaming machine (EGM).

DETAILED DESCRIPTION

Figure 1:
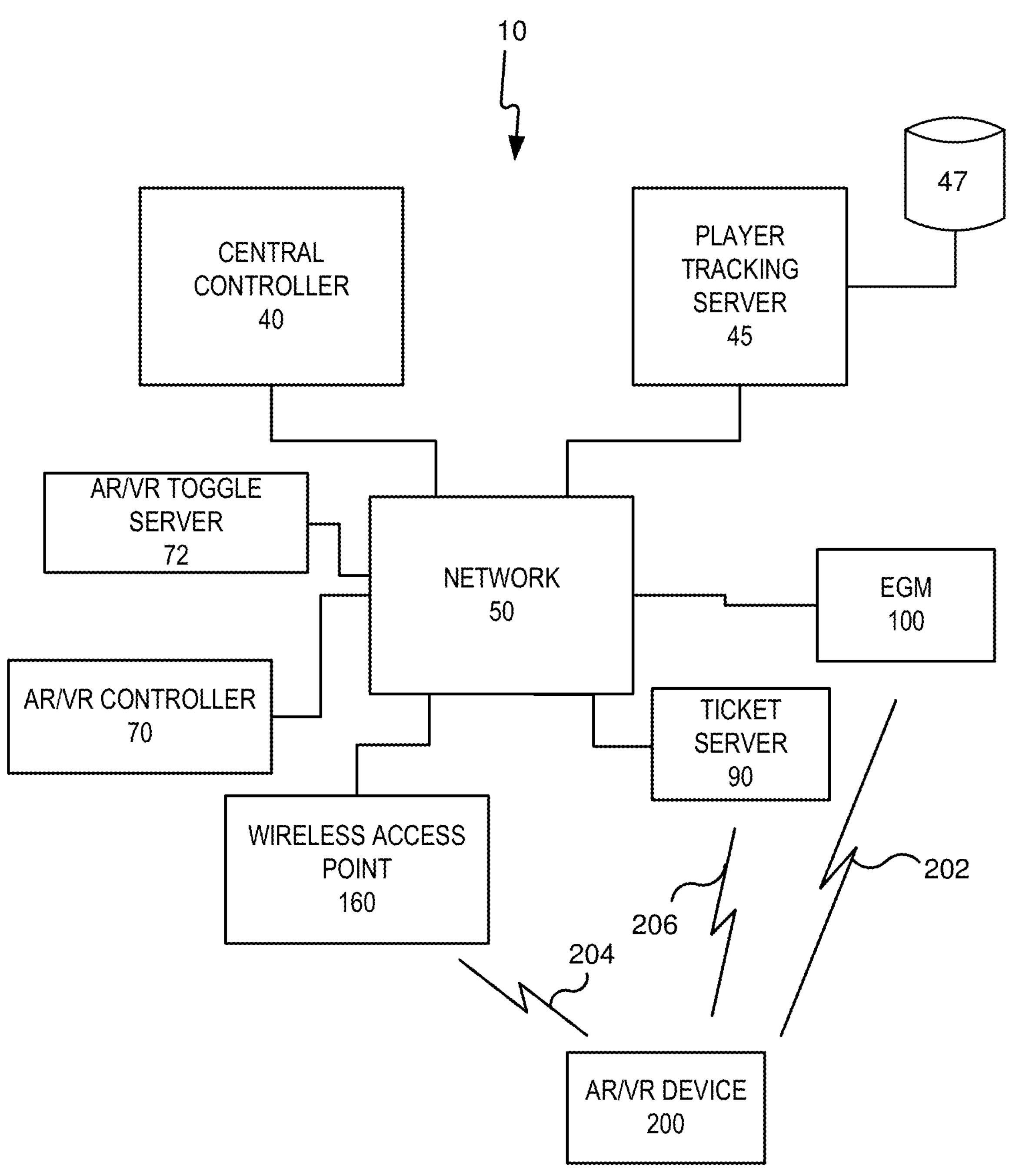
FIG. 1 is a schematic block diagram illustrating a network configuration for a plurality of gaming devices according to some embodiments.

It may be advantageous to allow customers to place wagers using Virtual Reality (VR) and/or Augmented Reality (AR) that may be toggled from one to another on the fly.

Technology corresponding to headsets has included headsets that may be able to toggle between Augmented Reality (AR) mode and Virtual Reality (VR) mode. On the fly toggling between AR and VR in a casino environment may provide previously unavailable experiences. For example, headsets combined with various device-integrated sensors may provide new opportunities that may provide significantly leverage casino gaming experiences.

In some embodiments, using headsets, such as battery driven headsets, may provide entirely different gaming modes to be toggled through on the fly. Examples of such made include “offline mode”, “AR mode”, “VR mode”, and/or “XR mode” (=mixed reality mode), seamlessly, with only one device.

Embodiments herein may describe how such technology may be bound to the gaming industry by describing casino systems and gaming methods that may be available based by on-the-fly toggling between the different modes.

Some embodiments may provide VR experiences in the casino or AR experiences. Both types may provide different experiences for the user, each having its own benefits and drawbacks. For example, VR may provide full immersion for the player but at the same time may isolate the player from its surrounding. AR, however, may allow the player to see their surroundings and may also augment digital content to their view. However, such experiences may be less capable at creating immersive experiences such as VR. As provided herein, the AR or VR technology may be tied to a specific device that enables either AR or VR. This may result in increased flexibility in terms of experience alternation between AR and VR examples.

As provided herein, a headset disclosed herein may be able to toggle between AR and VR modes, as well as to turn the headset off by actuating a button or other input device. Embodiments herein provide that the same head-worn device may provide experiences that may change dynamically, completely flexibly, and/or between AR, VR and off.

Embodiments herein may include technologies and/or components such as head-worn device that is able to toggle between AR, VR and Off modes with complete flexibility. For example, mode selection may be performed by a user manually actuating s switch by pressing a button and/or moving a slider to toggle between the modes.

In some embodiments, modes may be selected using voice interaction to toggle between modes. Some embodiments include providing virtual elements that a user may interact with to toggle between modes. For example, virtual 3D buttons may be provided as a user interface for toggling between modes.

Some embodiments may provide that hand gestures may be detected to provide an input that may toggle between modes. In some embodiments, a camera-tracked by the head-worn device may provide an input to toggle between modes. Some embodiments provide that a camera tracked by a gaming device, such as an EGM may provide an input to toggle between modes.

In some embodiments, the toggle between modes may be performed automatically in response to an event that is occurring in a game. For example, a dynamic, game-event dependent toggling mode may be provided.

Some embodiments provide that an AR/VR system disclosed herein may provide content within each mode. For example, some embodiments provide that content corresponding to a currently played game may be bound locally to the specific EGM.

In some embodiments, a casino-wide system may provide that an AR/VR device is connected within the casino and/or with different gaming devices in the casino. In some embodiments, an AR/VR device may be connected with other player's devices such as other headsets and/or other types of mobile terminals.

Some embodiments are directed to a wider-ranging system, such as a wide area network, any venue that is connected online, online casinos, and/or different gaming channels and/or types thereof. Examples of gaming channels may include online casino, VR casino, lottery, and/or sports betting among others. In some embodiments, an AR/VR device may include players from around the world.

As disclosed herein, features provided below may describe some technological aspects of an on-the-fly toggleable AR/VR device. Such features may enhance more gaming-specific examples and may be combined with one or more other features to create novel in-casino experiences.

According to some embodiments, an AR/VR device may include a manual switch for toggling between modes. In such embodiments, a manual switching may include actuating a mechanical and/or electromechanical switch, providing a gesture that may be detected, and/or receiving a voice command. In this manner, the casino experience can be toggled based on individual preferences.

In some embodiments, modes may be toggled based on automated switching. For example, some embodiments provide that each event in a casino is associated with a mode, predefined by the system. Whenever entering such an event, the corresponding mode may be activated automatically.

In some embodiments, geo-fencing for mixed reality mode and VR may be provided so that if a user goes into an area flagged by the venue, the area may cause the mode to be disabled and/or off to disable the AR/VR device in the flagged area. Examples of flagged areas may include private areas such as washrooms or cash distribution, among others. User safety may be improved by turning the AR/VR modes off if the user is in danger of being hurt due to inattention.

In some embodiments, a headset may include object detection included therein. Embodiments provide that object detection may turn off the XR/VR modes to prevent the user from colliding with objects and/or other users.

In some embodiments, the headset may include a microphone that may identify a name of a user and/or other key words that may be spoken. In response to detecting such sounds, the XR/VR modes made by turned off to allow a substantially transparent display to be enabled and/or may pause a game or other activity.

Some embodiments provide a customizable switch between different modes. For example, a player may save their preferences when modes are changed. In some embodiments, there may be a list of different options/experiences in which the player can select the desired mode for each one uniquely. Some embodiments provide that when entering a specific experience, the headset may toggle automatically. In some embodiments, players may customize their modes using the headset and/or an external application that may be used to pre-configure and/or use at a terminal, such as a casino terminal. In some embodiments, a player's preferences may be saved in a central database. In this manner, the same preferences may be used on different EGMs and/or types thereof. For example, regardless of the EGM and/or type thereof, the preferred settings may be automatically restored. Some embodiments, customized modes may be saved so that, when the player uses another device, the preferred settings may be automatically restored.

In some embodiments, the headset may shut down based on responsible gaming features. In some embodiments, the responsible gaming features may cause a message, such as a pop-up message, to signal excessive play, timers and/or requests for user to take breaks. Some embodiments provide that users may self-exclude to disallow devices from working while on a self-exclude list. In some embodiments, AR/XR features may be turned off when hitting gaming limits and may log out the user. Users may be allowed to exclude certain features and/or areas such as a high roller room to support responsible gaming features. Some embodiments provide that different modes may correspond to different volatility. For example, the VR mode may provide the most volatile features, AR mode may provide a medium level of volatility, and OFF may include the least amount of volatile features. In this manner, responsible gaming detection may cause the player to be prevented from playing AR/VR mode by the headset by disabling these modes automatically based on by the system detected play behavior.

In some embodiments, the headset described herein may be a casino-owned device in which the casino includes a casino pick-up station where the player receives their device from. Some embodiments provide that receiving the headset comprise a do-it-yourself station and/or a station that includes a casino staff member. In some embodiments provide that once the player receives a device, they may “pair” it to their user profile, which may be performed by scanning a player tracking card, among others. Such pairing may be with the headset itself and/or during the hand-over process.

Some embodiments may include an integrated tracking card reader. For example, the headset may have a tracking card reader integrated, so the user may not need an EGM’s card reader. In some embodiments, preferred modes settings may be applied by just activating the tracking card with the headset by inserting the card, and/or by scanning it wirelessly such as via near field communication.

Some embodiments provide that a pairing mode may use the headset’s camera to scan a QR code on the gaming machine’s display to pair. In some embodiments, the tracking card may be entered into the machine to automatically pair the headset with the corresponding machine. In some examples, after a gaming session, the connection between headset and the gaming device may be terminated immediately through a cash out.

Some embodiments provide that the user may bring their own headset. In such cases, pairing with the casino system and/or network may be required. For example, a casino QR code may be scanned and/or a personalized access code may be received at a casino entrance. Scanning may immediately pair the device with the casino network and all its gaming features.

Some embodiments provide that gaming modes based on on-the-fly toggling may include a walk through a casino venue with an Off and/or AR mode. The EGM may be cashed in and a VR mode may be activated to completely play the game in VR.

Other modes include a walk through the casino venue in an Off and/or AR mode. The EGM may be played in AR mode and VR mode may be activated when entering a VR bonus feature. In some embodiments, a player may enter an “advanced details” mode about a game by entering the VR mode. Such advanced details may include a display of high scores, and/or game statistics in the VR mode.

In some embodiments, a player may choose to start with the Off/AR mode, and decide anytime during play of the EGM to enter VR mode to completely escape the local casino environment and be fully immersed into the VR version of the EGM game with a completely designed virtual environment. A trigger to cause the change to VR mode may include the user toggling the switch from Off/AR to VR. In some embodiments, a trigger may include that the device is synced with casino events such as live concerts and/or bingo drawings, among others. In such embodiments, the headset may provide data corresponding to when the event ends and then either automatically change to VR mode or inform the player that an event has just finished and offer to switch to the VR mode. In some embodiments, a player preference may be to play in VR whenever nothing important is happening in the casino.

Some embodiments provide onboarding training and/or tutorials. In such embodiments, the user may start the game with Off mode and play several games according to tutorial instructions. The user may then be asked to switch to AR mode so the user may experience using AR-enabled features. Finally, the user may be prompted to switch to VR mode and experience the VR-enabled features. Once tutorial is completed, user may play in any mode they select with knowledge corresponding to each mode’s characteristics. In this manner, advanced game modes (AR, VR) may be unlocked by earning experience points in a regular game mode.

Some embodiments include cross-channel gaming in AR/VR. For example, when activating VR mode, the connected EGMs game may be streamed completely into VR. Then, in VR, it may be possible to play other channel’s games such as sports betting, and/or an online games, among others. Each of these other channel games may be included in the VR mode adjacent the EGM play. When switching over to play in AR mode, whether automatically or user-defined, the EGM’s game play may then be activated on the EGM’s game screen again. Other channel games may be shown via the AR next to the EGM game. In this manner, a mix of EGM game play and AR other channel game play may be achieved.

Some embodiments include game mode dependent game rules. In such embodiments, the player may start a game in Off mode, with regular game rules provided to familiarize themselves with the game. Once eligible for AR mode, the game may provide a prompt to ask the player if they want to switch to AR to unlock additional game rules. Additionally, game rules may include expanded reels, and/or a bigger reel matrix, among others. Some embodiments provide that, if activated, new wagering options may be enabled in response to changing the mode to AR. And once enough game progress is made in the AR mode, the user may continue in VR mode, in which other game rules may be activated.

Some embodiments include a game-mode dependent level of immersion. In addition to having rules change by switching from one mode to another mode, the amount of game immersion/visual environment of an in-game atmosphere can be changed. For example, a regular game environment may toggle to a game with an augmented environment, which may also toggle to a game with a virtual environment.

In some embodiments, “find the gem” type game features may provide that in a bonus game the player must move from mode to mode to collect all of the gems necessary to finish the bonus. In some embodiments, element A may be found on the EGM’s screen, element B may be found in AR mode and element C may be found in VR mode. Once the player goes through each mode and collects all 3 elements, a certain bonus might be triggered. In some embodiments, the bonus may be split across the different modes and may require the user to consume each bonus play-off in the respective mode.

In some embodiments, artificial intelligence (AI) powered headsets, when in a VR mode in a casino, may partially turn off based on where a player is looking. In this manner, the player may see promotions on the screen, jackpots, and/or servers asking to take orders, among others. In some embodiments, the headset may be sensitive to sound and may be equipped with speech recognition such that when something important happens, game related or not, the headset may switch to AR.

In some embodiments, a spatial VR/AR mixed adaptation to the casino may be provided. For example, the VR world may be adapted to the environment of the casino while the virtual world that the player is in may have little to no similarity to the casino. By adapting the virtual world, the player may navigate through the casino including locating and adapting casino hotspots and/or maintaining the functionality of the facility.

Some embodiments provide an AI powered smooth transition from mode to mode. For example, when players switch from VR to AR depending on a current theme of the VR world, virtual elements may transition in a smooth way. A smooth transition may include a VR world in an icy winter environment melting down in response to changing to warmer climate as the player changes to AR.

In some embodiments, the VR may be provided as a paid feature. For example, players may not gain access to a VR feature, without playing and wining certain amount at the EGM and/or in an AR version. As soon as the player wins a given amount, then the world may mutates to a VR version and provide a unique experience, which may tempt the player to play more.

Some embodiments include an XR/VR scavenger hunt in a venue in which the player may participate in a scavenger hunt. In some examples, the player may register and the XR/VR headset may turn off. The player may look around the venue and XR/VR headset may turn on when the player is getting close to an item. Turning on the headset may prompt user to look for items. In some embodiments, the user may look for an item and may select an item for the hunt with gesture control and/or other system inputs system. Once an item is found, a next item may be indicated to the user to search for and the game may continue.

Virtual/Augmented Reality Systems and Viewers

Referring to FIG. 1, a gaming system 10 including a plurality of EGMs 100 is illustrated. As discussed above, the EGMs 100 may be one type of a variety of different types of gaming devices. The gaming system 10 may be located, for example, on the premises of a gaming establishment, such as a casino. The EGMs 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the EGMs 100. Communications over the data communication network 50 may be encrypted for security. The central controller 40 may be any suitable server or computing device which includes at least one processing circuit and at least one memory or storage device. Each EGM 100 may include a processing circuit that transmits and receives events, messages, commands or any other suitable data or signal between the EGM 100 and the central controller 40. The EGM processing circuit is operable to execute such communicated events, messages or commands in conjunction with the operation of the EGM 100. Moreover, the processing circuit of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processing circuits. Moreover, in some embodiments, one or more of the functions of one or more EGM processing circuits as disclosed herein may be performed by the central controller 40.

A wireless access point 160 provides wireless access to the data communication network 50. The wireless access point 160 may be connected to the data communication network 50 as illustrated in FIG. 1 or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

As further illustrated in FIG. 1, an AR/VR device 200 is provided. The AR/VR device 200 may communicate with one or more elements of the gaming system 10 to render two-dimensional (2D) and/or three-dimensional (3D) content to a player of one of the EGMs 100, the AR/VR toggle server 72, and/or the ticket server 90 in a virtual space. In the context of the AR/VR device 200, the player may be able to see objects in the real space around the player. That is, the AR/VR device 200 combines a virtual image from AR display content with real images perceived by the user, including images of real objects as well as objects printed on the wagering ticket. In this manner, the AR/VR device 200 "mixes" real and virtual reality into a single viewing experience for the player. In some embodiments, the AR/VR device 200 may be further configured to enable the player to interact with both the real and virtual objects displayed to the player by the AR/VR device 200. When in VR mode, the AR/VR device 200 may provide full visual content without including images of real-world objects and/or environments.

The AR/VR device 200 may communicate with one or more elements of system 10 to coordinate the rendering of images such as mixed reality images in the case of the AR/VR 200. For example, in some embodiments, the AR/VR device 200 may communicate directly with the ticket server 90 over a wireless interface 204, which may be a WiFi link, a Bluetooth link, an NFC link, etc. In other embodiments, the AR/VR device 200 may communicate with the data communication network 50 (and devices connected thereto, including EGMs and the coin pusher) over a wireless interface 204 with the wireless access point 160. The wireless interface 204 may include a WiFi link, a Bluetooth link, an NFC link, etc. In further embodiments, the AR/VR device 200 may communicate simultaneously with both the ticket server 90 over the wireless interface 206 and the wireless access point 160 over the wireless interface 204. Some embodiments provide that AR/VR device 200 may communicate with one or more of the EGMs 100 over a wireless interface 202. In these embodiments, wireless interface 202, wireless interface 204 and wireless interface 206 may use different communication protocols and/or different communication resources, such as different frequencies, time slots, spreading codes, etc. For example, in some embodiments, the wireless interface 202 may be a Bluetooth link, while the wireless interface 204 and/or 206 may be a WiFi link.

The wireless interfaces 202, 204, 206 allow the AR/VR device 200 to coordinate the generation and rendering of images including mixed reality images to the player via the AR/VR device 200.

In some embodiments, the gaming system 10 includes a mixed reality controller, or AR/VR controller 70. The AR/VR controller 70 may be a computing system that communicates through the data communication network 50 with the ticket server 90 and the AR/VR device 200 to coordinate the generation and rendering of virtual images to one or more players using the AR/VR devices 200. The VR/AR controller 70 may be implemented within or separately from the central controller 40. In some embodiments, an AR/VR toggle server 72 may include data corresponding to an AR mode and/or VR mode for use by an AR/VR device 200. For example, the AR/VR toggle server may include data corresponding to when the AR/VR device 200 may toggle to a different mode and/or what events trigger the togging of the AR/VR device to change modes.

In some embodiments, the AR/VR controller 70 may coordinate the generation and display of the virtual images of the same virtual object to more than one player by more than one AR/VR device 200. As described in more detail below, this may enable multiple players to interact with the same virtual object together in real time. This feature can be used to provide a shared multiplayer experience to multiple players at the same time.

Moreover, in some embodiments, the AR/VR controller 70 may coordinate the generation and display of the same virtual object to players at different physical locations, as will be described in more detail below.

Referring to FIGS. 2A to 2E, the AR/VR device 200 may be implemented in a number of different ways. For example, referring to FIG. 2A, in some embodiments, an AR/VR device 200A may be implemented as a 3D headset including a pair of semitransparent lenses 212 on which images of virtual objects may be displayed. In some embodiments, the AR/VR device 200A may be a head-mounted AR/VR headset that includes internal screens and may mix images with the physical world.

Different stereoscopic images may be displayed on the lenses 212 to create an appearance of depth, while the semitransparent nature of the lenses 212 allows the user to see both the real world as well as the 3D image rendered on the lenses 212. The AR device 200A may be implemented, for example, using a Hololens™ from Microsoft Corporation. The Microsoft Hololens includes a plurality of cameras 234 and other sensors 211 that the device uses to build a 3D model of the space around the user. The device 200A can generate a 3D image to display to the user that takes into account the real-world objects around the user and allows the user to interact with the 3D object.

The device 200A may further include other sensors 232, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers 235 that allow the user to interact audially with the device.

Figures 2A, 2B, 2C, 2D:
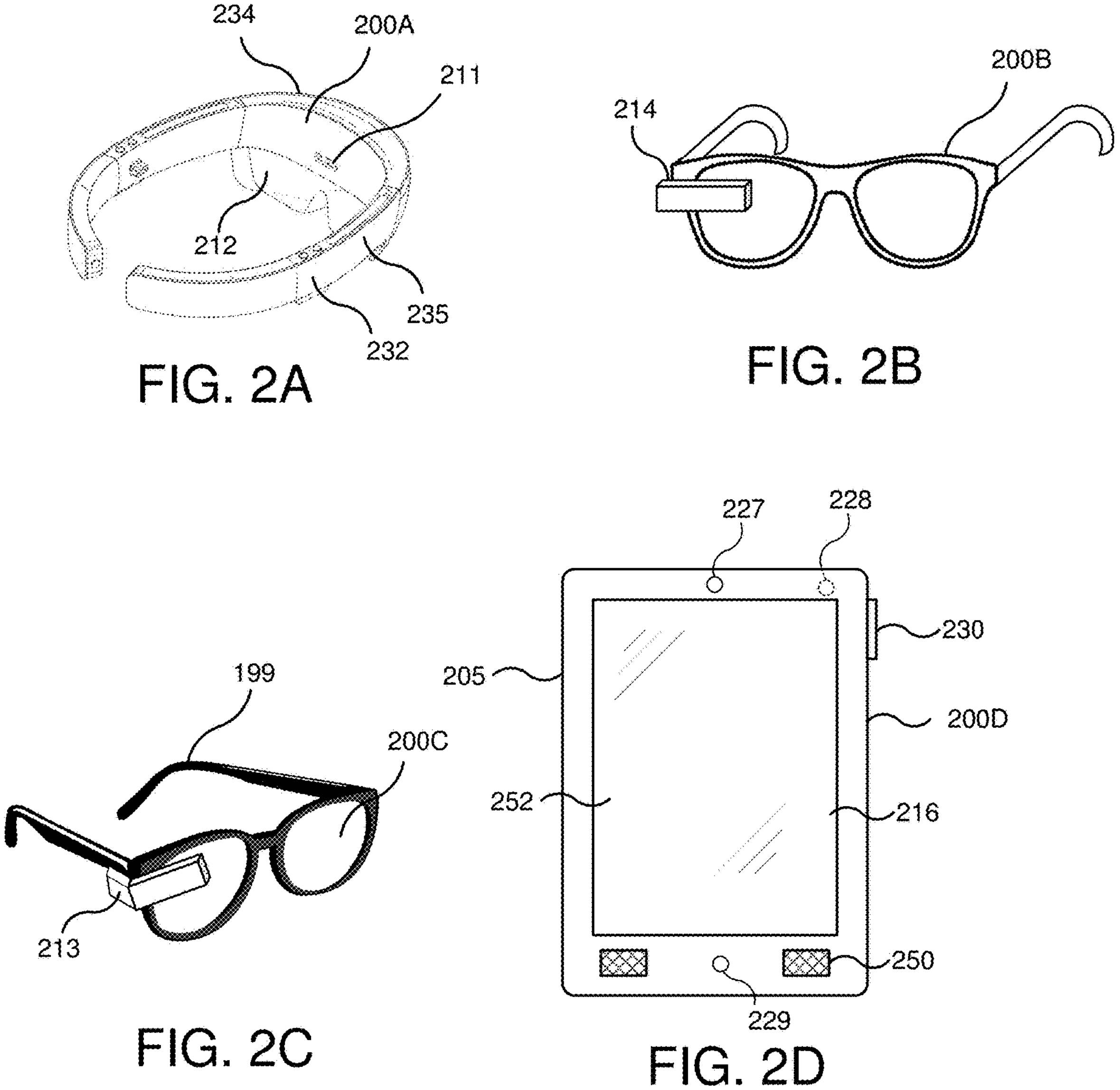
FIGS. 2A to 2E illustrate augmented/virtual reality viewing devices according to various embodiments.

Referring to FIG. 2B, an AR device 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer.

In other embodiments, referring to FIG. 2C, the AR device may be implemented using a virtual retinal display device 200C. In contrast to devices that display an image within the field of view of the user, a virtual retinal display 200C may raster scan an image directly onto the retina of the user. In some embodiments, the virtual retinal display 200C may include glasses 199 that may support and/or position virtual retinal display 200C relative to the user's eyes. In some embodiments, the virtual retinal display 200C may be configured to be removably coupled to glasses that are not provided with the virtual retinal display 200C. In such embodiments, the virtual retinal display may be used in conjunction with user supplied glasses 199 that may include lenses for correcting vision impairments. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, an AR device 200D, as shown in FIG. 2D, may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

Figure 2E:
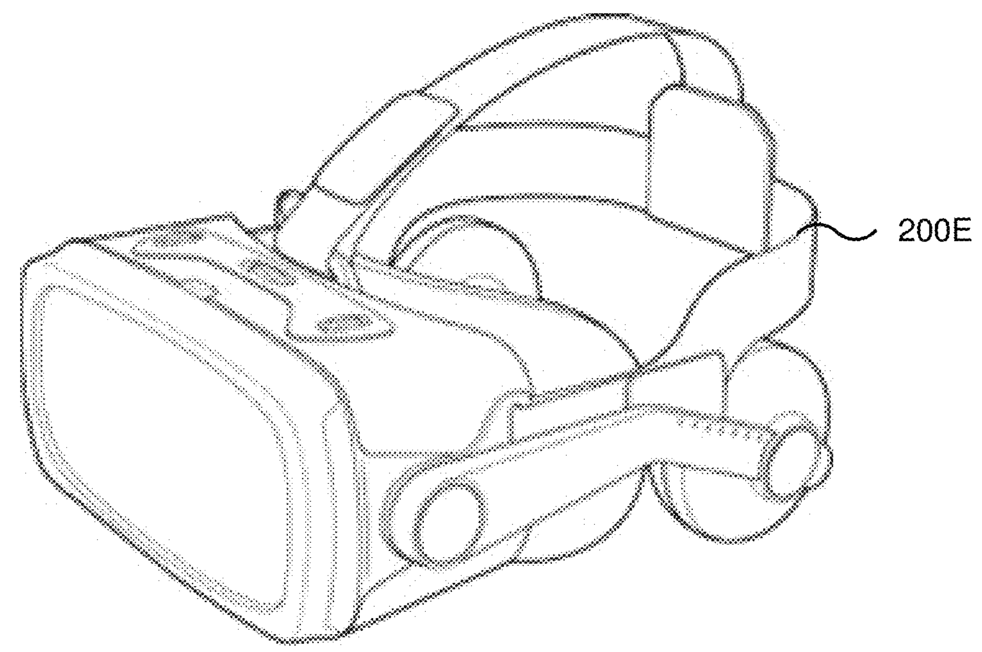

In still further embodiments, an AR device 200E, as shown in FIG. 2E, may be implemented using head mounted display that includes various features described herein including input devices like cameras and microphones as well as hand-held components (not shown here that may be used to provide inputs to the VR device. The device 200E may be a handheld device including a housing on which a touchscreen display device including a digitizer is provided. An input button may be provided on the housing and may act as a power or control button. A rear facing camera may be provided in a front face of the housing. The device 200E may further include a front facing camera on a rear face of the housing. The device 200E may include one or more speakers and a microphone. The device 200E may provide a virtual reality display based on the event server and the sports wagering system and the video signals that are generated on the device 200E.

Figure 2F:
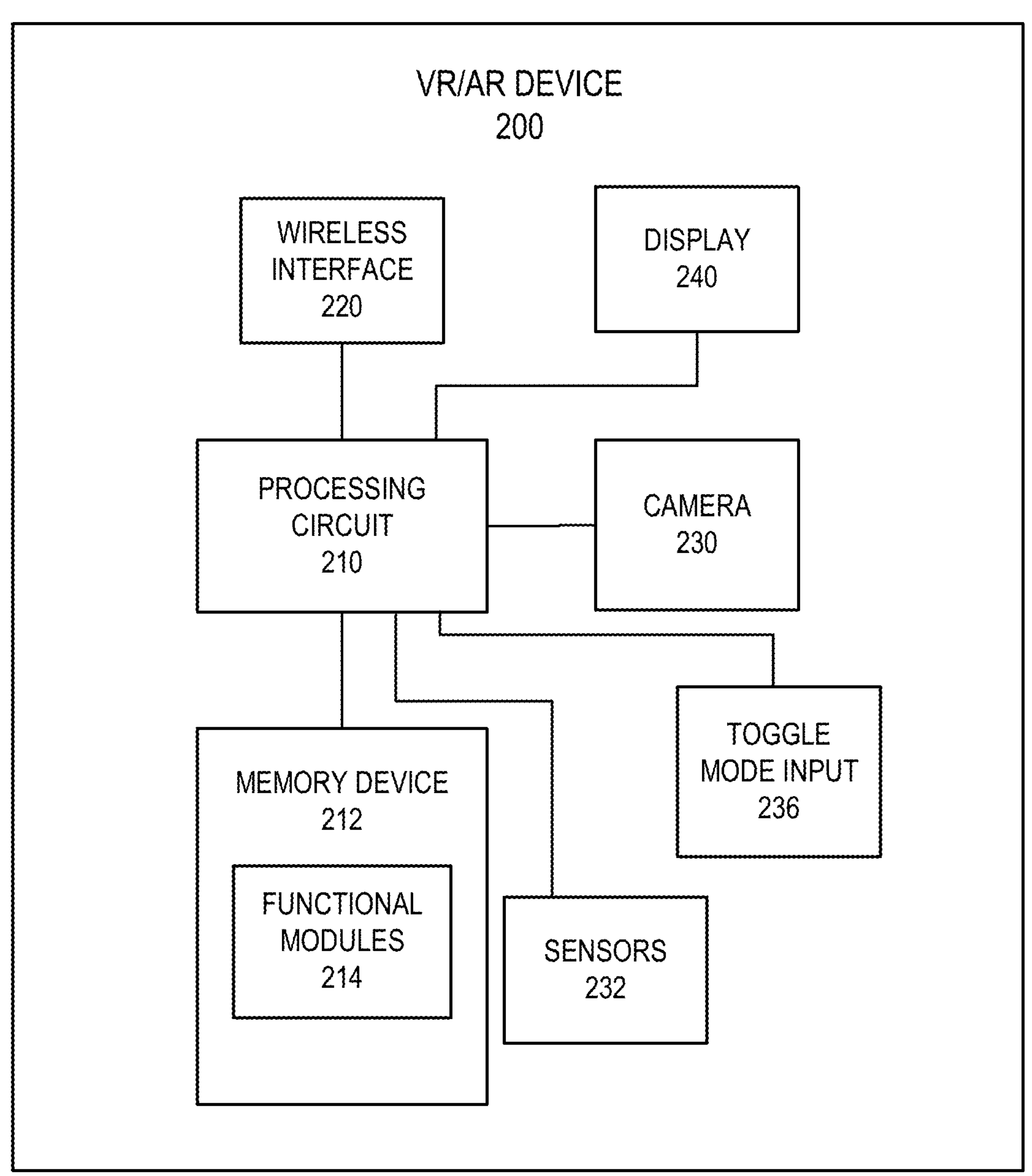
FIG. 2F is a schematic block diagram of an augmented/virtual reality device according to some embodiments.

FIG. 2F is a block diagram that illustrates various components of an VR/AR device 200 according to some embodiments. As shown in FIG. 2F, the VR/AR device 200 may include a processing circuit that controls operations of the VR/AR device 200. Although illustrated as a single processing circuit, multiple special purpose and/or general-purpose processors and/or processor cores may be provided in the VR/AR device 200. For example, the VR/AR device 200 may include one or more of a video processor, a signal processor, a sound processor and/or a communication controller that performs one or more control functions within the VR/AR device 200. The processing circuit 210 may be variously referred to as a "controller," "microcontroller," "microprocessor" or simply a "computer." The processing circuit 210 may further include one or more application-specific integrated circuits (ASICs).

Various components of the VR/AR device 200 are illustrated in FIG. 2F as being connected to the processing circuit 210. It will be appreciated that the components may be connected to the processing circuit 210 through a system bus, a communication bus and controller, such as a USB controller and USB bus, a network interface, or any other suitable type of connection.

The VR/AR device 200 further includes a camera 230 for generating a video signal and a display 240 for displaying VR/AR graphics to a user as virtual images and/or virtual elements. The VR/AR graphics may be displayed directly within a field of view so as to appear to be present within a scene and/or may be digitally added to a live video signal so as to appear to be present within the live video signal.

The VR/AR device 200 may include a toggle mode input 236 that is operable to receive an input signal to change the mode from among VR, AR and off. In some embodiments, the toggle mode input 236 comprises a switch, manual or electronic, that when actuated, caused the mode to toggle. In some embodiments, the toggle mode input 236 is generated automatically to cause the mode to toggle to a different mode in response to an external event and/or trigger.

The VR/AR device 200 further includes a memory device 212 that stores one or more functional modules 214 for performing the operations described herein.

The memory device 212 may store program code and instructions, executable by the processing circuit 210, to control the VR/AR device 200. The memory device 210 may include random access memory (RAM), which can include volatile and/or non-volatile RAM (NVRAM) and other forms as commonly understood in the gaming industry. In some embodiments, the memory device 212 may include read only memory (ROM). In some embodiments, the memory device 212 may include flash memory and/or EEPROM (electrically erasable programmable read only memory). Any other suitable magnetic, optical and/or semiconductor memory may operate in conjunction with the gaming device disclosed herein.

The VR/AR device 200 may include a wireless interface 220 that enables the AR device 200 to communicate with remote devices, such as EGMs 100 and/or an VR/AR controller 70 over a wired and/or wireless communication network, such as a local area network (LAN), wide area network (WAN), cellular communication network, wireless LAN (Wifi), Bluetooth, near-field communications (NFC) or other data communication network. The wireless interface 220 may include multiple radios to support multiple types of simultaneous connections. For example, the wireless interface may include both a Wifi radio transceiver and a Bluetooth radio transceiver.

Electronic Gaming Machines

Figure 3A:
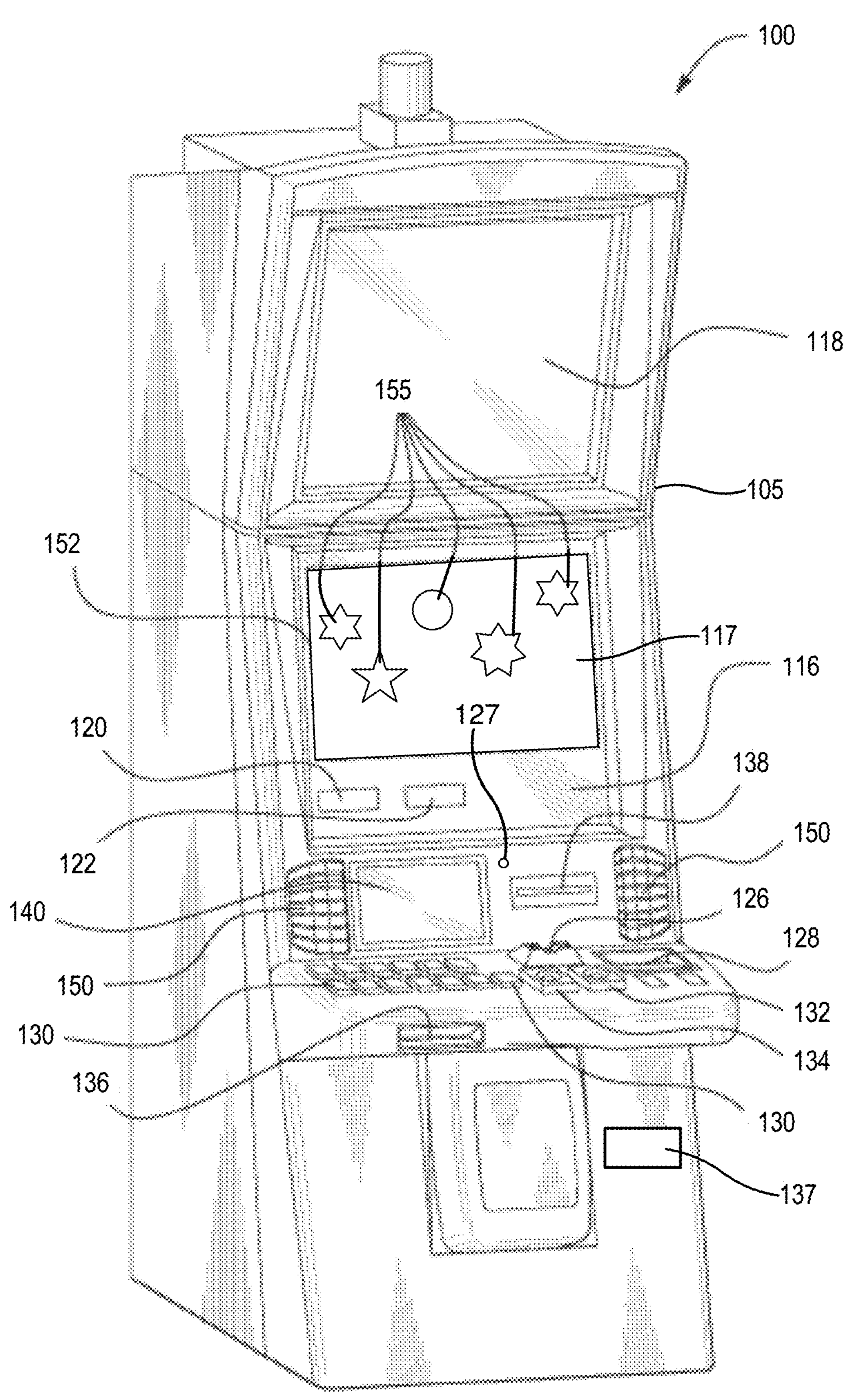
FIG. 3A is a perspective view of a gaming device that can be configured according to some embodiments.
Figure 3B:
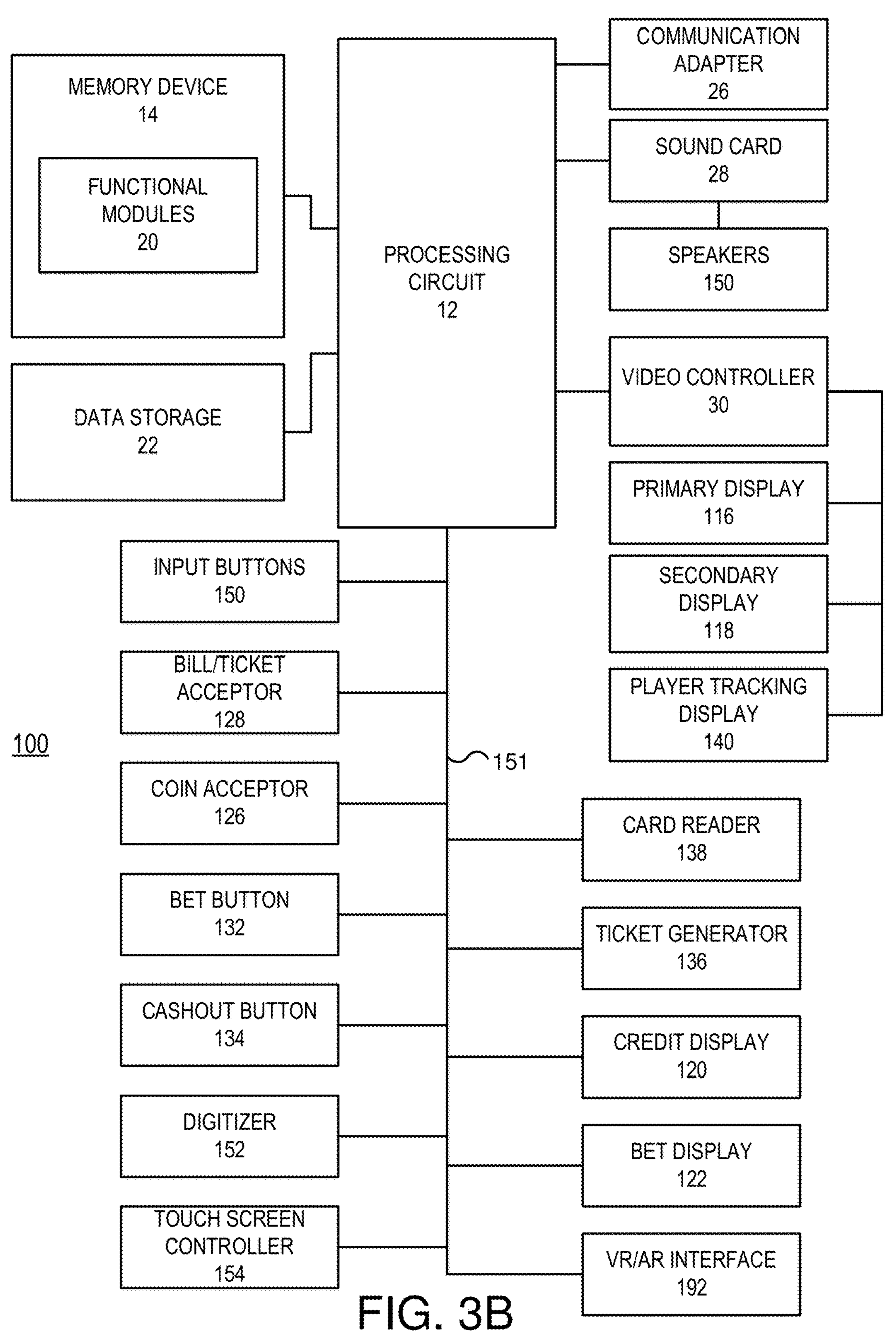
FIG. 3B is a schematic block diagram illustrating an electronic configuration for a gaming device according to some embodiments.
Figure 3C:
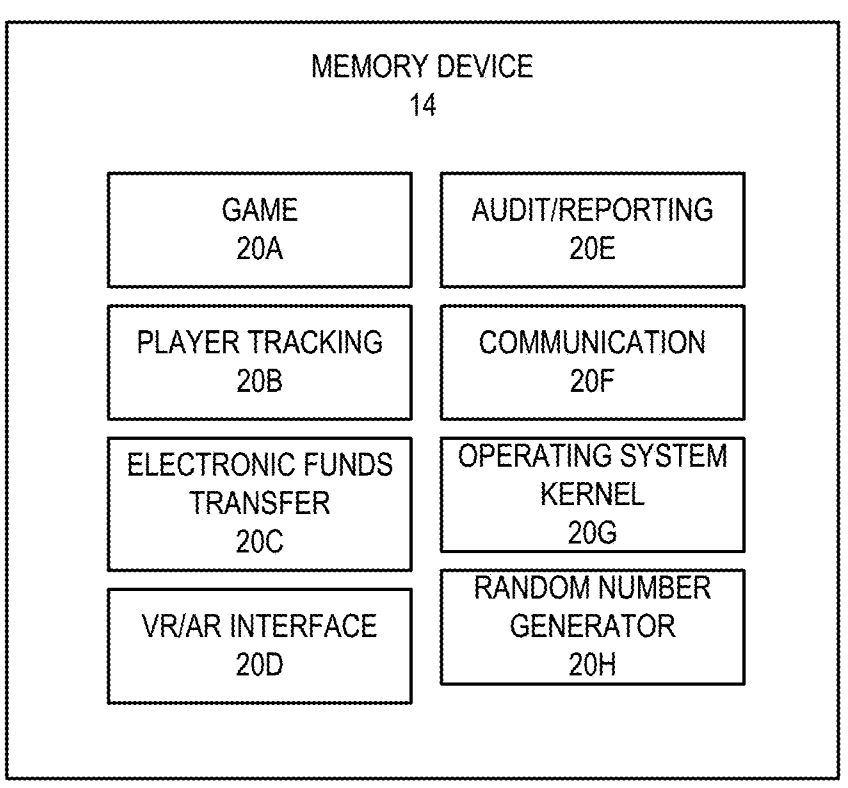
FIG. 3C is a schematic block diagram that illustrates various functional modules of a gaming device according to some embodiments.

Embodiments herein may include different types of gaming devices. One example of a gaming device includes an electronic gaming machine (EGM) 100 that can interact with mixed reality viewers according to various embodiments is illustrated in FIGS. 3A, 3B, and 3C in which FIG. 3A is a perspective view of an EGM 100 illustrating various physical features of the device, FIG. 3B is a functional block diagram that schematically illustrates an electronic relationship of various elements of the EGM 100, and FIG. 3C illustrates various functional modules that can be stored in a memory device of the EGM 100. The embodiments shown in FIGS. 3A to 3C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs 100 typically include a number of standard features, many of which are illustrated in FIGS. 3A and 3B. For example, referring to FIG. 3A, an EGM 100 may include a support structure, housing or cabinet 105 which provides support for a plurality of displays, inputs, outputs, controls and other features that enable a player to interact with the EGM 100.

The EGM 100 illustrated in FIG. 3A includes a number of display devices, including a primary display device 116 located in a central portion of the cabinet 105 and a secondary display device 118 located in an upper portion of the cabinet 105. A plurality of game components 155 are displayed on a display screen 117 of the primary display device 116. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the EGM 100.

The player tracking display 140 may be used to display a service window that allows the player to interact with, for example, their player loyalty account to obtain features, bonuses, comps, etc. In other embodiments, additional display screens may be provided beyond those illustrated in FIG. 3A. In some embodiments, one or more of the player tracking display 140, the credit display 120 and the bet display 122 may be displayed in one or more portions of one or more other displays that display other game related visual content. For example, one or more of the player tracking display 140, the credit display 120 and the bet display 122 may be displayed in a picture in a picture on one or more displays.

The EGM 100 may further include a number of input devices 130 that allow a player to provide various inputs to the EGM 100, either before, during or after a game has been played. For example, the EGM 100 may include input devices 130 that are a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 3A and 3B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices 130 of the EGM 100 are one or more wagering or betting devices. One such wagering or betting device includes a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 3B). The player may interact with the EGM 100 by touching virtual buttons on one or more of the display devices 116, 118, 140. Accordingly, any of the above-described input devices, such as the input buttons 130, the game play initiation button 132 and/or the cashout button 134 may be provided as virtual buttons on one or more of the display devices 116, 118, 140.

Referring briefly to FIG. 3B, operation of the primary display device 116, the secondary display device 118 and the player tracking display 140 may be controlled by a video controller 30 that receives video data from a processing circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 3A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

As illustrated in FIG. 3A, the EGM 100 may also include a currency dispenser 137 that may include a note dispenser configured to dispense paper currency and/or a coin generator configured to dispense coins or tokens in a coin payout tray.

The EGM 100 may further include one or more speakers 150 controlled by one or more sound cards 28 (FIG. 3B). The EGM 100 illustrated in FIG. 3A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 3B is a block diagram that illustrates logical and functional relationships between various components of an EGM 100. As shown in FIG. 3B, the EGM 100 may include a processing circuit 12 that controls operations of the EGM 100. Although illustrated as a single processing circuit, multiple special purpose and/or general-purpose processors and/or processor cores may be provided in the EGM 100. For example, the EGM 100 may include one or more of a video processor, a signal processor, a sound processor and/or a communication controller that performs one or more control functions within the EGM 100. The processing circuit 12 may be variously referred to as a "controller," "microcontroller," "microprocessor" or simply a "computer." The processor may further include one or more application-specific integrated circuits (ASICs).

Various components of the EGM 100 are illustrated in FIG. 3B as being connected to the processing circuit 12. It will be appreciated that the components may be connected to the processing circuit 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 3D.

The memory device 14 may store program code and instructions, executable by the processing circuit 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processing circuit through a universal serial bus (USB) hub (not shown) connected to the processing circuit 12.

In some embodiments, the EGM 100 may include a sensor, such as a camera in communication with the processing circuit 12 (and possibly controlled by the processing circuit 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processing circuit 12 may incorporate that image into the primary and/or secondary game as a game image, symbol or indicia.

The VR/AR interface 192 may interact with a VR/AR device 200. For example, in some embodiments, the VR/AR interface 192 may provide a signal or trigger to cause the VR/AR device 200 to toggle from one an off, a VR and/or an AR mode to another one of those modes. In some embodiments, the VR/AR interface 192 may be operable to receive an input that causes the mode to toggle.

Various functional modules of that may be stored in a memory device 14 of an EGM 100 are illustrated in FIG. 3C. Referring to FIG. 3C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back-end server or financial institution to transfer funds to and from an account associated with the player. The VR/AR interface module 20D interacts with a VR/AR device 200 as described in more detail herein. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 comprises a personal device, such as a desktop computer, a laptop computer, a mobile device, a tablet computer or computing device, a personal digital assistant (PDA), or other portable computing devices. In some embodiments, the EGM 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 3D:
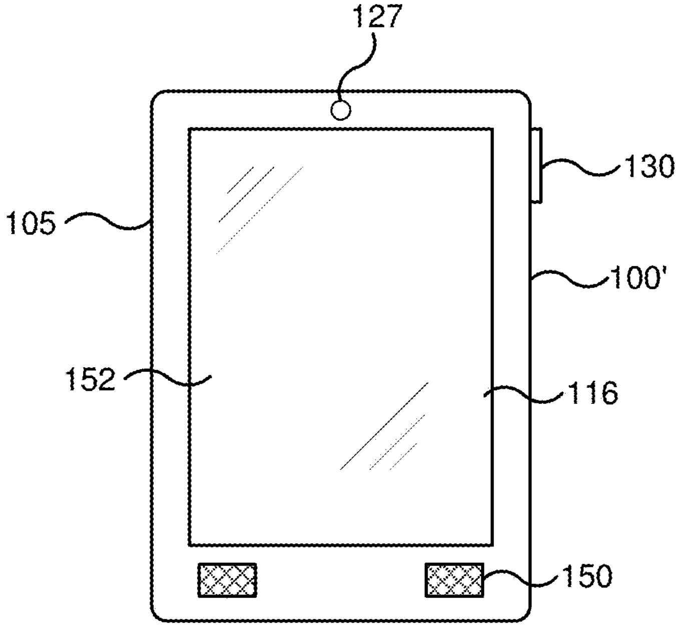
FIG. 3D is a perspective view of a gaming device that can be configured according to some embodiments.

For example, referring to FIG. 3D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 3E:
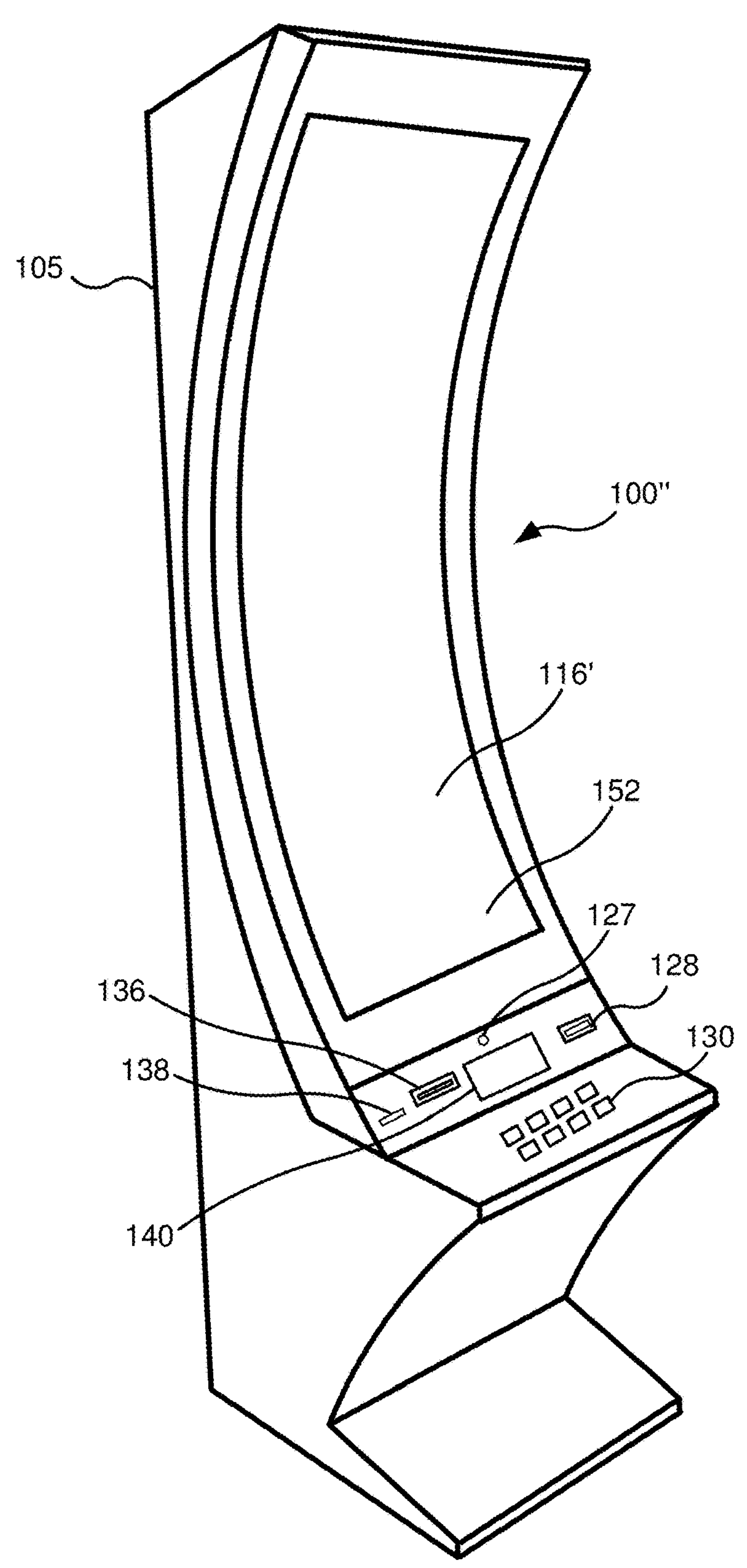
FIG. 3E is a perspective view of a gaming device according to further embodiments.

FIG. 3E illustrates a standalone EGM 100" having a different form factor from the EGM 100 illustrated in FIG. 3A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Although illustrated as EGMs, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, EGMs according to embodiments herein may be implemented using mobile terminals, such as smart phones, tablets, and/or laptop computers, among others.

VR/AR Controller

Figure 4:
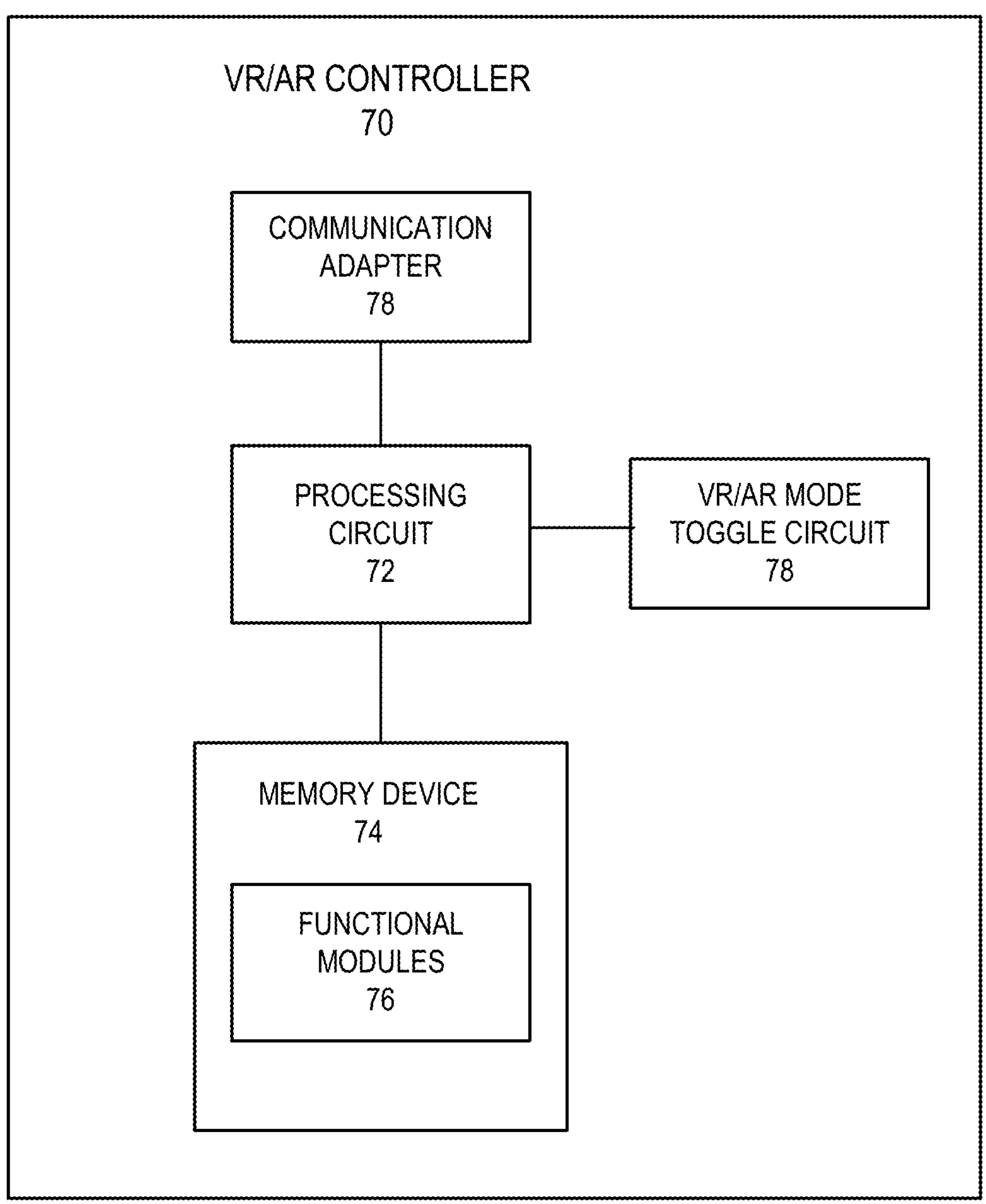
FIG. 4, which is a block diagram that illustrates various components of an VR/AR controller according to some embodiments.

Reference is now made to FIG. 4, which is a block diagram that illustrates various components of a VR/AR controller 70 according to some embodiments. As shown in FIG. 4, the VR/AR controller 70 may include a processing circuit 72 that controls operations of the VR/AR controller 70. Although illustrated as a single processing circuit 72, multiple special purpose and/or general-purpose processors and/or processor cores may be provided in the VR/AR controller 70. For example, the VR/AR controller 70 may include one or more of a video processor, a signal processor, a sound processor and/or a communication controller that performs one or more control functions within the VR/AR controller 70. The processing circuit 72 may be variously referred to as a "controller," "microcontroller," "microprocessor" or simply a "computer." The processing circuit may further include one or more application-specific integrated circuits (ASICs).

Various components of the VR/AR controller 70 are illustrated in FIG. 4 as being connected to the processing circuit 72. It will be appreciated that the components may be connected to the processing circuit 72 through a system bus, a communication bus and controller, such as a USB controller and USB bus, a network interface, or any other suitable type of connection.

The VR/AR controller 70 further includes a memory device 74 that stores one or more functional modules 76 for performing the operations described above.

The memory device 74 may store program code and instructions, executable by the processing circuit 72, to control the VR/AR controller 70. The memory device 74 may include random access memory (RAM), which can include non-volatile RAM (NVRAM), magnetic RAM (MRAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The VR/AR controller 70 may include a communication adapter 78 that enables the VR/AR controller 70 to communicate with remote devices, such as EGMs 100, coin pusher games 90 and/or a player tracking server 45 (FIG. 1) over a wired and/or wireless communication network, such as a local area network (LAN), wide area network (WAN), cellular communication network, or other data communication network.

The VR/AR controller 70 may include a VR/AR mode toggle circuit 78 that may cause the VR/AR device to change modes to one of off, VR and/or AR.

The VR/AR controller 70 may include one or more internal or external communication ports that enable the processing circuit 72 to communicate with and to operate with internal or external peripheral devices, such as display screens, keypads, mass storage devices, microphones, speakers, and wireless communication devices. In some embodiments, internal or external peripheral devices may communicate with the processing circuit 72 through a universal serial bus (USB) hub (not shown) connected to the processing circuit 72.

Other EGM Features

Embodiments described herein may be implemented in various configurations for EGMs 100*s*, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device. For example, a mobile device may be communicatively coupled to an EGM and may include a user interface that receives user inputs that are received to control the EGM. The user inputs may be received by the EGM via the mobile device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Embodiments provided herein may provide improved accessibility to wagering stations by including additional user interface technologies, such as virtual and/or augmented reality. Such embodiments may improve technological efficiency by coordinating the augmented reality with examples of different types of wagering stations.

Figure 5:
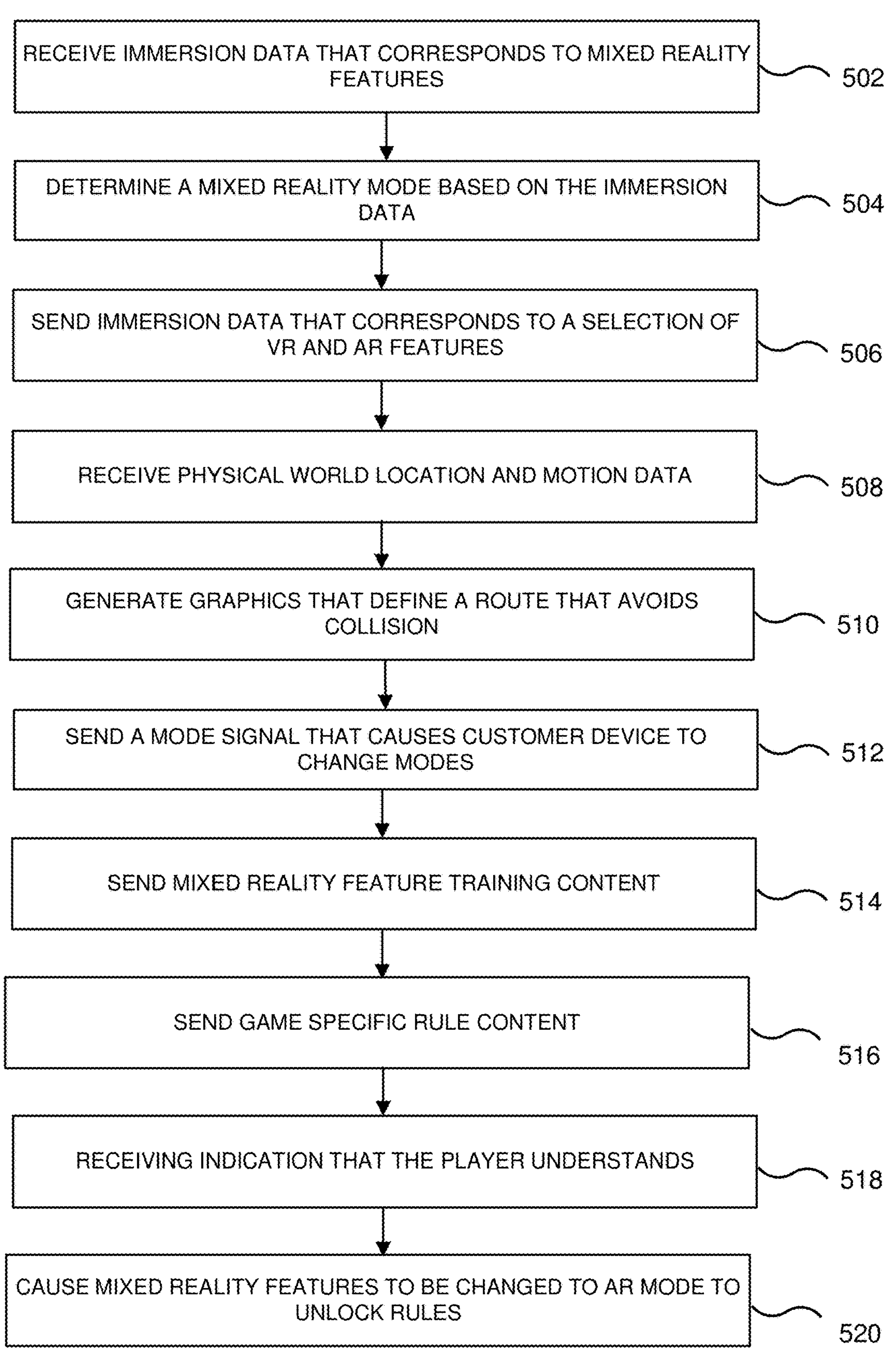
FIG. 5 is a flowchart illustrating operations of systems/methods for on demand toggle of augmented reality and virtual reality experiences according to some embodiments.

Reference is now made to FIG. 5, which is a flowchart illustrating operations of systems/methods for on demand toggle of augmented reality and virtual reality experiences according to some embodiments. Systems may include a communication interface, a processing circuit, and a memory coupled to the processing circuit, the memory comprising machine readable instructions that, when executed by the processing circuit, cause the processing circuit to receive immersion data that corresponds to mixed reality features that are available in a casino environment (block 502).

In some embodiments, the immersion data causes the mixed reality mode to toggle from a first mixed reality mode to a second mixed reality mode that is different from the first mixed reality mode. Some embodiments provide that a casino event is associated with the mixed reality mode. Some embodiments provide that, responsive to a customer activating the casino event, the mixed reality mode corresponding to the casino event is automatically triggered.

In some embodiments, the processing circuit is further caused to determine (block 504) a mixed reality mode based on the immersion data. Some embodiments provide that the immersion data causes the mixed reality mode to toggle from a first mixed reality mode to a second mixed reality mode that is different from the first mixed reality mode.

In some embodiments, a casino event is associated with the mixed reality mode. Such embodiments provide that, responsive to a customer activating the casino event, the mixed reality mode corresponding to the casino event is automatically triggered.

In some embodiments, the processing circuit is further caused to send (block 506), to a customer device and from a mixed reality server, immersion data that corresponds to a selection of virtual reality (VR), and/or augmented reality (AR) features that correspond to the mixed reality mode.

In some embodiments, the customer device includes a multiple mode wearable headset that is configured to selectively operate in one or more of an off-line mode, an AR mode, and a VR mode. A mixed reality mode may include a combination of the off-line mode, the AR mode and the VR mode. In some embodiments, the multiple mode wearable headset is modified responsive to determining that a responsible gaming indicator has been triggered. In such embodiments, modifying the multiple mode wearable headset may include disabling the mixed reality mode. In some embodiments, the responsible gaming indicator is configured to receive a self-exclusion signal that identifies a mode that is not accessible via the multiple mode wearable headset.

In some embodiments, the processing circuit is further caused to receive (block 508) physical world location and motion data corresponding to a real world object and the customer device. The processing circuit may be further caused to generate (block 510) VR graphics that define a route that avoids a collision with the real world object.

In some embodiments, the customer device includes a gaming session with an electronic game machine (EGM) that was initiated in an off mode of mixed reality features or an AR mode. In some embodiments, the processing circuit is further caused to send (block 512) a mode signal that causes the customer device to switch modes. In some embodiments, in response to receiving a mode trigger that causes a mode change, a mode change signal is sent to the customer device to change to an VR mode to escape the casino environment and to increase immersion to be fully immersed in the gaming session of the EGM using a designed virtual environment.

Some embodiments provide that the customer device includes a gaming session with an electronic game machine (EGM) that was initiated in an off mode of mixed reality features or an AR mode. In some embodiments, the processing circuit is further caused to send (block 514) mixed reality feature training content that provides instructions to the customer device for using the mixed reality modes. Some embodiments provide that the mixed reality feature training content corresponds to the immersion data.

In some embodiments, the customer device includes a gaming session with an electronic game machine (EGM) that was initiated in an off mode of mixed reality features or an AR mode. The processing circuit is further caused to send (block 516) game specific game rule content to the customer device and receive (block 518) indication that a player understands the game specific game rule content, and cause (block 520) the mixed reality features to be changed to an AR mode to unlock additional game specific game rules.

In some embodiments, the customer device includes a multiple mode wearable headset. Responsive to the multiple mode wearable headset being in VR mode in the casino environment, selective portions of content displayed via the multiple mode wearable headset are partially turned off to content of a real-world visual in the selective portions.

Some embodiments provide that the customer device includes a multiple mode wearable headset that is configured to selectively operate in one or more of an offline mode, an AR mode, a VR mode and the mixed reality mode. In some embodiments, a portion of content displayed via the multiple mode wearable headset transitions from a first mode to a second mode that is different from the first mode in a gradual manner. In some embodiments, transitioning from the first mode to the second mode may be responsive to a graphical transition of a game.

In some embodiments, the customer device includes a multiple mode wearable headset that is configured to selectively operate in one or more of an offline mode, an AR mode, a VR mode and the mixed reality mode. In some embodiments, the multiple mode wearable headset includes a microphone that is operable to determine a relative position of a speaker. In some embodiments, the processing circuit is further caused to change the immersion data based on the relative position of the speaker.

In some embodiments, the customer device provides a scavenger hunt session that may include a findable physical and/or virtual object. The customer device may change an immersion level responsive to the customer device being proximate the findable physical and/or virtual object.

In some embodiments, the processing circuit is further caused to determine casino environment conditions. For example, immersion data may further correspond to the casino environment conditions. In some embodiments, the virtual reality includes a virtual environment that is mapped to adapt the virtual environment with a physical environment corresponding to a casino.

In some embodiments, the immersion data is changed based on environmental changes in a casino. For example, in response to the immersion data changing, an immersion level provided by the customer device may be automatically increased.

Figure 6:
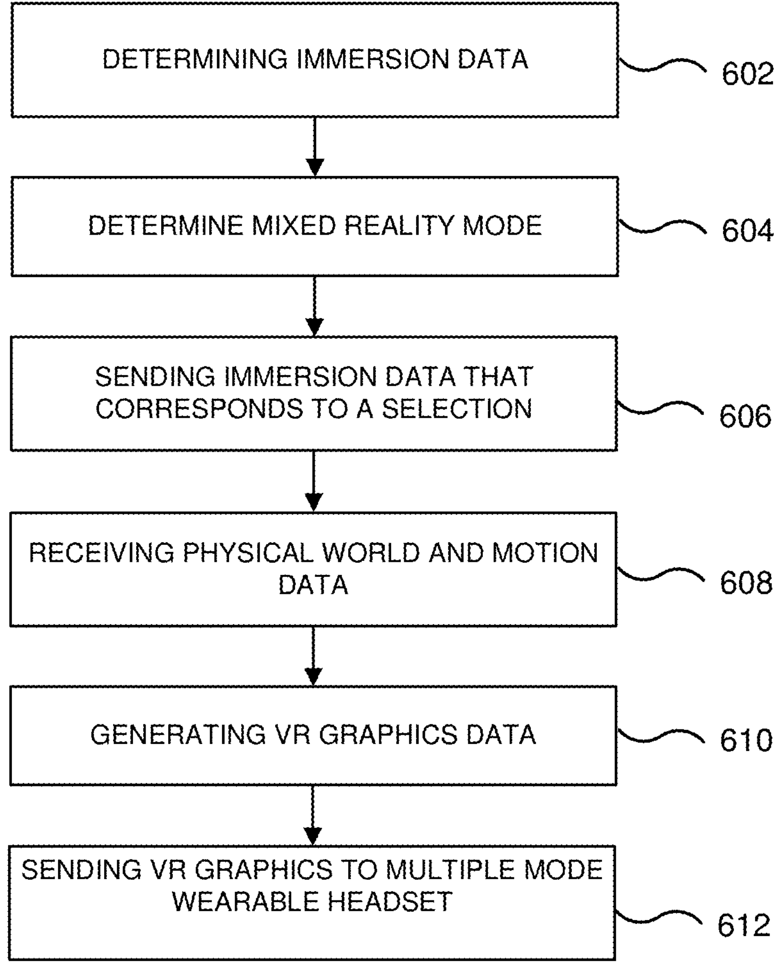
FIG. 6 is a flowchart illustrating operations of systems/methods for on demand toggle of augmented reality and virtual reality experiences according to some embodiments.

Reference is now made to FIG. 6, which is a flowchart illustrating operations of systems/methods for on demand toggle of augmented reality and virtual reality experiences according to some embodiments. Operations according to some embodiments include determining (block 602), by a mixed reality server, immersion data that that corresponds to mixed reality features that are provided in a gaming environment. Operations may include determining (block 604), a mixed reality mode that is based on the immersion data and sending (block 606), via a communication interface, to a multiple mode wearable headset and from the mixed reality server, immersion data that corresponds to a selection of one of multiple immersion modes.

Operations may include receiving (block 608), via the communication interface and into the mixed reality server, physical world location and motion data corresponding to a real world object and the multiple mode wearable headset. Embodiments may further include, in response to the physical world location and motion data, generating (block 610) VR graphics data that defines a route for a user of the multiple mode wearable headset to avoid a collision with the real world object. Operations may further include, in response to generating the VR graphics data, sending (block 612) the VR graphics data to the multiple mode wearable headset.

Figure 7:
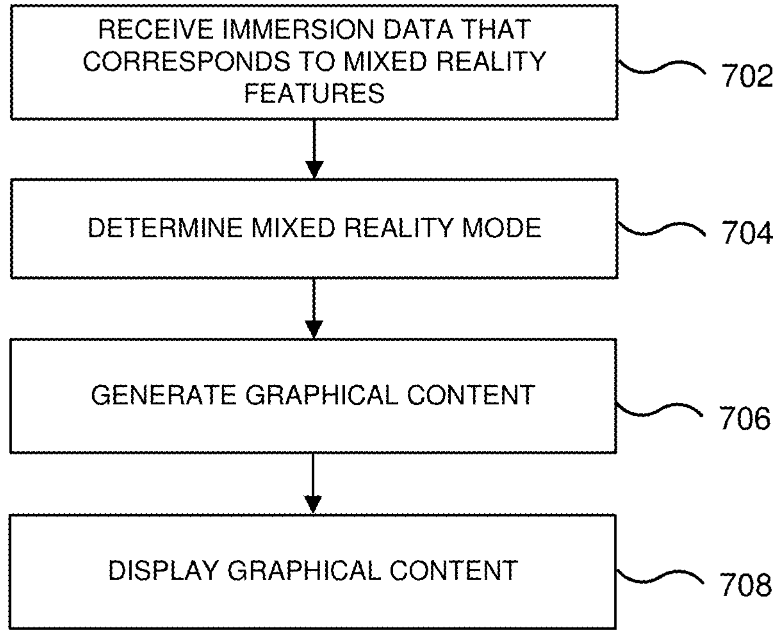
FIG. 7 is a flowchart illustrating operations of systems/methods for on demand toggle of augmented reality and virtual reality experiences according to some embodiments.

Reference is now made to FIG. 7, which is a flowchart illustrating operations of systems/methods for on demand toggle of augmented reality and virtual reality experiences according to some embodiments.

In some embodiments, devices may include a communication interface, a display, a camera, a processing circuit and a memory coupled to the processing circuit, the memory comprising machine readable instructions that, when executed by the processing circuit, cause the processing circuit to receive (block 702), via the communication interface and from a mixed reality server, immersion data that corresponds to mixed reality features that are provided to a user in a casino environment. In some embodiments the mixed reality features include a VR mode and an AR mode. A device may be further caused to determine (block 704) a mixed reality mode that corresponds to the immersion data. Graphical content corresponding to the mixed reality features may be generated (block 706). In some embodiments, the graphical content may be displayed (block 708) on the display. In some embodiments, the graphical content includes VR content and AR content. Some embodiments provide that a gaming session begins with the VR content being displayed on the display and the gaming session transitions to the AR content being displayed on the display. The AR content includes an image of a portion of an electronic gaming machine (EGM).

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A mixed reality controller comprising:

a communication interface;

a processing circuit; and a memory coupled to the processing circuit, the memory comprising machine readable instructions that, when executed by the processing circuit, cause the processing circuit to:

receive immersion data that corresponds to mixed reality features that are available in a casino environment;

determine a mixed reality mode of a plurality of mixed reality modes based on the immersion data, the plurality of mixed reality modes comprising an off-line mode, an augmented reality (AR) mode, a virtual reality (VR) mode, and a mixed reality mode that comprises a combination of the off-line mode, the AR mode and the VR mode; and transmit, to a wearable customer device and from a mixed reality server, immersion data that corresponds to a selection of VR and AR features that correspond to the mixed reality mode, wherein the immersion data comprises instructions that control a Graphical User Interface (GUI) of the wearable customer device to provide the selection of VR and AR features via a display device of the wearable customer device.

2. The mixed reality controller of claim 1, wherein the immersion data causes the mixed reality mode to toggle from a first mixed reality mode to a second mixed reality mode that is different from the first mixed reality mode.

3. The mixed reality controller of claim 1, wherein a casino event is associated with the mixed reality mode and wherein, responsive to a customer activating the casino event, the mixed reality mode corresponding to the casino event is automatically triggered.

4. The mixed reality controller of claim 1, wherein the wearable customer device is modified responsive to determining that a responsible gaming indicator has been triggered, wherein modifying the wearable customer device comprises disabling the mixed reality mode.

5. The mixed reality controller of claim 4, wherein the responsible gaming indicator comprises receiving a self-exclusion signal that identifies a mode that is not accessible via the wearable customer device.

6. The mixed reality controller of claim 1, wherein the processing circuit is further caused to:

receive physical world location and motion data corresponding to a real world object and the wearable customer device; and generate VR graphics that define a route that avoids a collision with the real world object.

7. The mixed reality controller of claim 1, wherein the wearable customer device comprises a gaming session with an electronic game machine (EGM) that was initiated in an off mode of mixed reality features, wherein the processing circuit is further caused to send a node signal that causes the wearable customer device, and wherein, responsive to receiving a mode trigger that causes a mode change, a mode change signal is sent to the wearable customer device to change to an VR mode to escape the casino environment and to increase immersion to be fully immersed in the gaming session of the EGM using a designed virtual environment.

8. The mixed reality controller of claim 1, wherein the wearable customer device comprises a gaming session with an electronic game machine (EGM) that was initiated in an off mode of mixed reality features, wherein the processing circuit is further caused to send mixed reality feature training content that provides instructions to the wearable customer device for using the mixed reality mode, wherein the mixed reality feature training content corresponds to the immersion data.

9. The mixed reality controller of claim 1, wherein the wearable customer device comprises a gaming session with an electronic game machine (EGM) that was initiated in an off mode of mixed reality features, the processing circuit is further caused to send game specific game rule content to the wearable customer device; receive indication that a player understands the game specific game rule content; and cause the mixed reality features to be changed to an AR mode to unlock additional game specific game rules.

10. The mixed reality controller of claim 1, wherein the wearable customer device comprises a multiple mode wearable headset, wherein, responsive to the multiple mode wearable headset being in VR mode in the casino environment, selective portions of content displayed via the multiple mode wearable headset are partially turned off to content of a real-world visual in the selective portions.

11. The mixed reality controller of claim 1, wherein the wearable customer device comprises a multiple mode wearable headset that is configured to selectively operate in an offline mode, an AR mode, and a VR mode, and wherein a portion of content displayed via the multiple mode wearable headset transitions from a first mode to a second mode that is different from the first mode in a gradual manner.

12. The mixed reality controller of claim 11, wherein transitioning from the first mode to the second mode is responsive to a graphical transition of a game.

13. The mixed reality controller of claim 1, wherein the wearable customer device comprises a multiple mode wearable headset that is configured to selectively operate in an offline mode, an AR mode, and a VR mode, and wherein the multiple mode wearable headset comprises a microphone that is operable to determine a relative position of a speaker, wherein the processing circuit is further caused to change the immersion data based on the relative position of the speaker.

14. The mixed reality controller of claim 1, wherein the wearable customer device provides a scavenger hunt session, wherein the scavenger hunt comprises a findable physical object, wherein the wearable customer device changes an immersion level responsive to the wearable customer device being proximate the findable physical object.

15. The mixed reality controller of claim 1, wherein the processing circuit is further caused to determine casino environment conditions, wherein the immersion data further corresponds to the casino environment conditions.

16. The mixed reality controller of claim 15, wherein a first VR feature comprises a virtual environment that is mapped to adapt the virtual environment with a physical environment corresponding to a casino.

17. The mixed reality controller of claim 1, wherein the immersion data is changed based on environmental changes in a casino, and wherein, responsive to the immersion data changing, an immersion level provided by the wearable customer device is automatically increased.

18. A method comprising:

determining, by a mixed reality server, immersion data that that corresponds to mixed reality features that are provided in a gaming environment;

determining, a mixed reality mode that is based on the immersion data;

sending, via a communication interface, to a multiple mode wearable headset and from the mixed reality server, immersion data that corresponds to a selection of one of a plurality of immersion modes, the plurality of immersion modes comprising an off-line mode, an augmented reality (AR) mode, a virtual reality (VR) mode, and a mixed reality mode that comprises a combination of the off-line mode, the AR mode and the VR mode;

based on the immersion data, controlling a Graphical User Interface (GUI) of the multiple mode wearable headset to provide the selected immersion mode;

receiving, via the communication interface and into the mixed reality server, physical world location and motion data corresponding to a real world object and the multiple mode wearable headset;

in response to the physical world location and motion data, generating VR graphics data that defines a route for a user of the multiple mode wearable headset to avoid a collision with the real world object;

in response to generating the VR graphics data, sending the VR graphics data to the multiple mode wearable headset; and based on the VR graphics data, controlling the GUI of the multiple mode wearable headset to provide the VR graphics data via a display device of the multiple mode wearable headset.

19. A wearable device comprising:

a communication interface;

a display comprising a Graphical User Interface (GUI) for selectively displaying Virtual Reality (VR) and Augmented Reality (AR) features;

a camera;

a processing circuit; and a memory coupled to the processing circuit, the memory comprising machine readable instructions that, when executed by the processing circuit, cause the processing circuit to:

receive, via the communication interface and from a mixed reality server, immersion data that corresponds to mixed reality features that are provided to a user in a casino environment, wherein the mixed reality features comprise a VR mode and an AR mode;

determine a mixed reality mode of a plurality of mixed reality modes that corresponds to the immersion data, the plurality of mixed reality modes comprising an off-line mode, an augmented reality (AR) mode, a virtual reality (VR) mode, and a mixed reality mode that comprises a combination of the off-line mode, the AR mode and the VR mode;

generate graphical content corresponding to the mixed reality features; and control the GUI of the display to provide the determined mixed reality mode and to display the graphical content, wherein the graphical content comprises VR content and AR content, wherein a gaming session begins with the VR content being displayed, on the display and the gaming session transitions to the AR content being displayed on the display, and wherein the AR content comprises an image of a portion of an electronic gaming machine (EGM).

* * * * *